(12) United States Patent
Kuo et al.

(10) Patent No.: US 12,638,639 B2
(45) Date of Patent: ***May 26, 2026

(54) DEVICES, SYSTEMS, AND METHODS FOR OPTICAL SIGNAL PROCESSING

(71) Applicant: Taiwan Semiconductor Manufacturing Company, Ltd., Hsinchu (TW)

(72) Inventors: Feng-Wei Kuo, Zhudong Township (TW); Hsing-Kuo Hsia, Jhubei City (TW); Chewn-Pu Jou, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/599,154

(22) Filed: Mar. 7, 2024

(65) Prior Publication Data

US 2024/0210628 A1     Jun. 27, 2024

Related U.S. Application Data

(63) Continuation of application No. 17/410,971, filed on Aug. 24, 2021, now Pat. No. 11,960,122.

(60) Provisional application No. 63/164,207, filed on Mar. 22, 2021.

(51) Int. Cl.
| | |
|---|---|
| *G02B 6/30* | (2006.01) |
| *G02B 6/12* | (2006.01) |
| *G02B 6/124* | (2006.01) |
| *G02B 6/32* | (2006.01) |
| *G02B 6/34* | (2006.01) |

(52) U.S. Cl.
CPC ........... *G02B 6/30* (2013.01); *G02B 6/12002* (2013.01); *G02B 6/124* (2013.01); *G02B 6/32* (2013.01); *G02B 6/34* (2013.01)

(58) Field of Classification Search
CPC ........ G02B 6/30; G02B 6/34; G02B 6/12002; G02B 6/124; G02B 6/32; G02B 2006/12102; G02B 2006/12107
See application file for complete search history.

(56) References Cited

U.S. PATENT DOCUMENTS 11,960,122 B2 *   4/2024   Kuo .......................... G02B 6/32
2013/0182998 A1   7/2013   Andry et al.

FOREIGN PATENT DOCUMENTS

| CN | 1480929 A | 3/2004 |
|---|---|---|
| CN | 106796326 A | 5/2017 |
| TW | 201945748 A | 12/2019 |

* cited by examiner

*Primary Examiner* — Michael P Mooney
(74) *Attorney, Agent, or Firm* — Finnegan, Henderson, Farabow, Garrett & Dunner, L.L.P.

(57) ABSTRACT

A device for optical signal processing includes a first layer, a second layer and a waveguiding layer. A lens is disposed within the first layer and adjacent to a surface of the first layer. The second layer is underneath the first layer and adjacent to another surface of the first layer. The waveguiding layer is located underneath the second layer and configured to waveguide a light beam transmitted in the waveguiding layer. A grating coupler is disposed over the waveguiding layer. The lens is configured to receive, from one of the grating coupler or a light-guiding element, the light beam, and focus the light beam towards another one of the light-guiding element or the grating coupler.

20 Claims, 11 Drawing Sheets

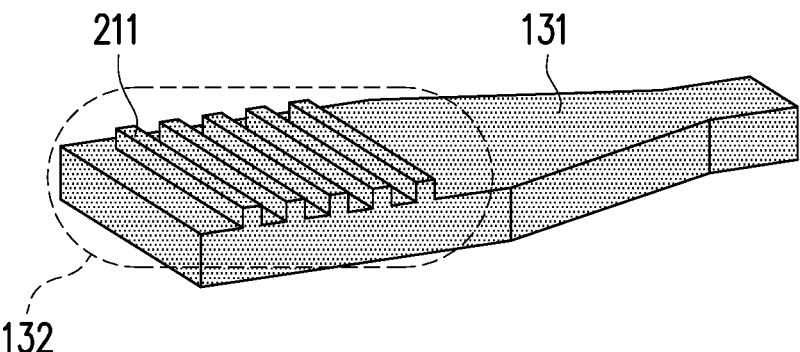
FIG. 2A
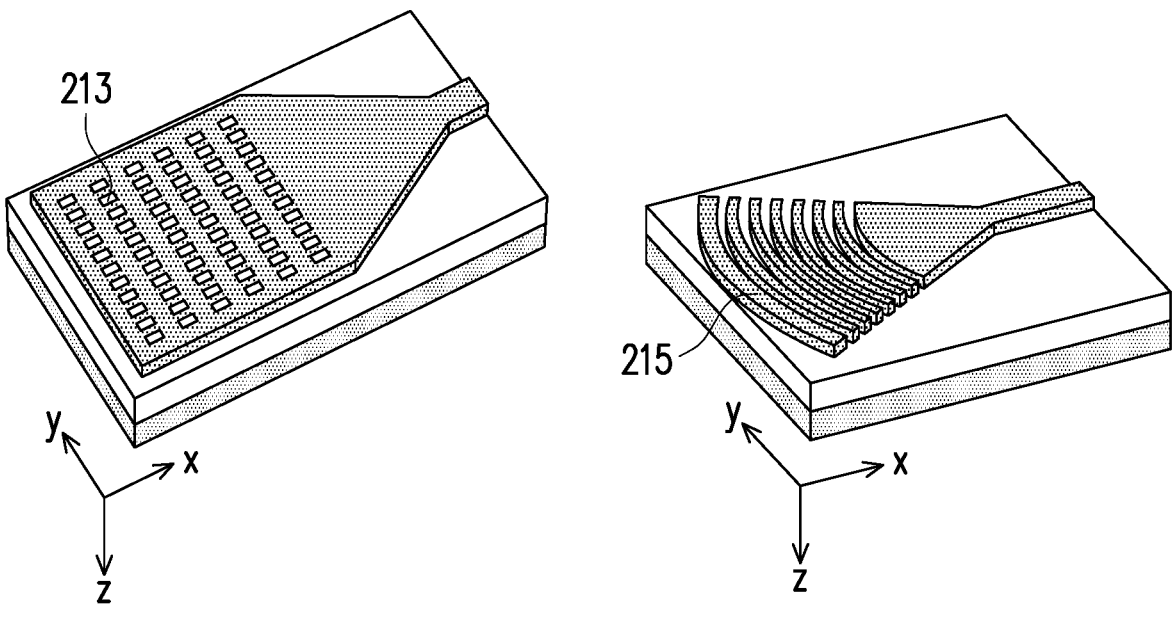
FIG. 2B                    FIG. 2C

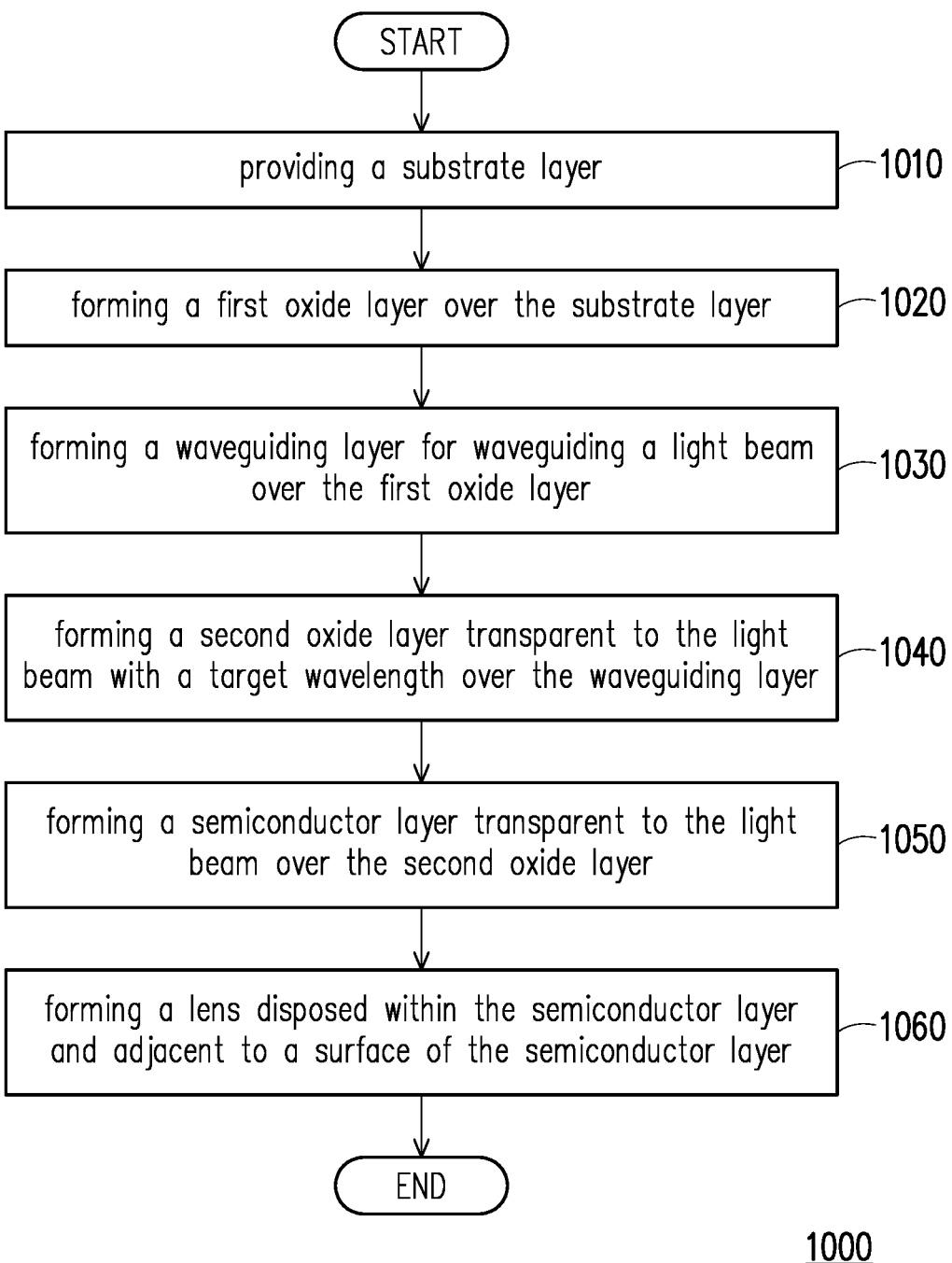

START providing a substrate layer —1010 forming a first oxide layer over the substrate layer —1020 forming a waveguiding layer for waveguiding a light beam over the first oxide layer —1030 forming a second oxide layer transparent to the light beam with a target wavelength over the waveguiding layer —1040 forming a semiconductor layer transparent to the light beam over the second oxide layer —1050 forming a lens disposed within the semiconductor layer and adjacent to a surface of the semiconductor layer —1060

END

DEVICES, SYSTEMS, AND METHODS FOR OPTICAL SIGNAL PROCESSING

REFERENCE TO RELATED APPLICATION

This application is a continuation application of U.S. Non-provisional patent application Ser. No. 17/410,971, filed on Aug. 24, 2021, which claims the benefit of U.S. Provisional Application No. 63/164,207, filed on Mar. 22, 2021, all of which are incorporated herein by reference in their entireties.

BACKGROUND

Silicon photonics is an enabling technology that provides integrated photonic devices and systems with low-cost mass manufacturing capability. It has attracted increasing attention, not only for its applications in communications but also in sensing. One issue of silicon photonics that comes with its high integration density is an interface between its high-performance integrated waveguide devices and optical fibers or free-space optics.

BRIEF DESCRIPTION OF THE DRAWINGS

Aspects of the present disclosure are best understood from the following detailed description when read with the accompanying figures. It is noted that various features are not drawn to scale. In fact, the dimensions of the various features may be arbitrarily increased or reduced for clarity of discussion or ease of illustration.

FIG. 1 is a diagram illustrating an exemplary optoelectronic integrated chip, consistent with some embodiments of the present disclosure.

FIGS. 2A-2E are diagrams respectively illustrating possible examples of grating patterns, consistent with some embodiments of the present disclosure.

FIG. 6 is a diagram illustrating an exemplary lens, consistent with some other embodiments of the present disclosure.

FIG. 10 is a flow chart illustrating a method for fabricating a semiconductor device for optical signal processing, consistent with some embodiments of the present disclosure.

DETAILED DESCRIPTION

Figure 2D:
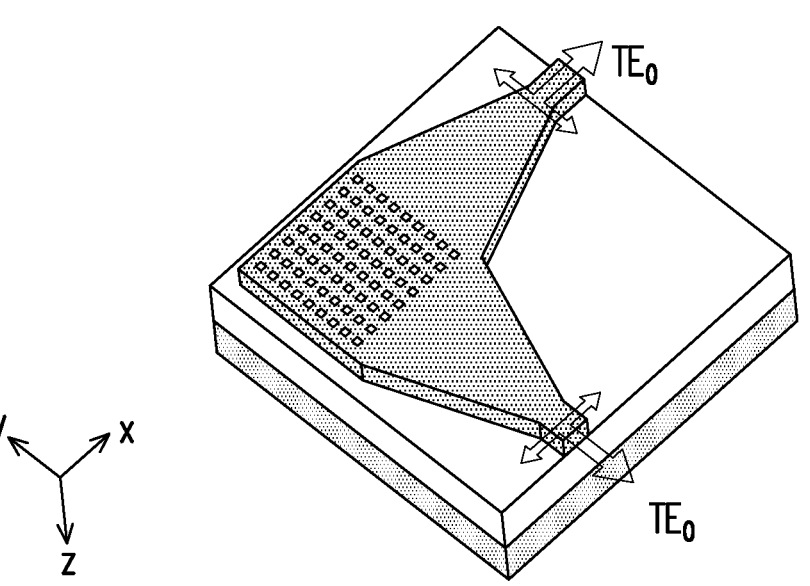

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "over," "above," "upper," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations), and the spatially relative descriptors used herein may likewise be interpreted accordingly.

As used herein, unless otherwise noted, the term "in proximity," "close to," "proximate," and the like, when comparing the distance between two regions within a device or a semiconductor structure, the semiconductor structure extending laterally and vertically through a characteristic length, width, and height, implies that the regions are at most ten percent of either the characteristic length, the characteristic width, or the characteristic height apart. The term "characteristic length" is the largest lengthwise dimension of the semiconductor structure, the term "characteristic width" is the largest widthwise dimension of the semiconductor structure, and the term "characteristic height" is the largest heightwise dimension of the semiconductor structure. The term "in proximity," "close to," "proximate," and the like, when comparing regions within a semiconductor structure, may also refer to adjacent regions (e.g., regions in contact with one another or spaced apart from one another). As used herein, unless otherwise noted, the term "remote" implies that regions are not adjacent to each other.

As used herein, unless otherwise noted, the term "thickness" for a layer that may include variable thickness implies the smallest thickness of the layer as measured throughout the layer.

As used herein, unless otherwise noted, the term "greater," "higher," "larger," "above," and the like, when comparing two values, the first value being greater than the second value, implies that the first value is at least five percent greater than the second value. Similarly, unless otherwise noted, the term "less," "lower," "smaller," and the like, when comparing two values, the first value is less than the second value, implies that the first value is at least five percent smaller than the second value. As used herein, unless otherwise noted, the term "comparable," "similar," and the like, when comparing two values, implies that one value is in the range of 95 to 105 percent of another value.

Further, as used herein, unless otherwise noted, the term "set" means one or more (i.e., at least one), and the phrase "any solution" means any now known or later developed solution. Furthermore, as used herein, unless otherwise noted, the term "substantially the same," when comparing a first set of values with the second set of values, implies that values in the first set of values are at most 10 percent different from the values in the second set of values. Further, the term "substantially the same," when comparing materials forming regions, implies that materials within regions are the same apart from unintended variations resulted from variation in fabrication techniques used to form the regions. Further, as used herein, unless otherwise noted, the term "substantially" when comparing the first value to a second value implies that the first value is at most 10 percent different from the second value.

Further, as used herein, unless otherwise noted, the term "parallel" when comparing two surfaces implies, that on average, two surfaces are oriented parallel to each other, wherein "on average" implies that first normal directed perpendicular to a first surface, at any point on the surface, and second normal directed perpendicular to a second surface, at any point on the surface, may be collinear with at most 10 degrees of difference from perfect collinearity. As used herein, unless otherwise noted, the term "nonparallel" when comparing two surfaces implies that the surfaces are not parallel as defined above.

Various embodiments generally relate to semiconductor devices containing photonic structures, and more particularly to semiconductor devices that include waveguiding layers, grating couplers, optical fibers, and the like. For example, the semiconductor device may include a first structure (herein referred to as an electrical die, "e-die") for processing electrical signals and a second structure (herein referred to as a photonic die, "p-die") for processing optical signals. In various embodiments, e-die and p-dies are formed within the same layered semiconductor structure, thus resulting in an optoelectronic integrated chip. Such an optoelectronic chip may be part of any suitable integrated circuit such as a radio-frequency integrated circuit (RFIC), power integrated circuit (IC), photonic integrated circuit (PIC), analog IC, mixed-mode IC, and the like.

FIG. 1 is a diagram illustrating an exemplary optoelectronic integrated chip 100, consistent with some embodiments of the present disclosure. The optoelectronic integrated chip 100 includes semiconductor layers, dielectric layers (e.g., oxide layers), as well as metallic contacts to various regions of these layers. In some embodiments, the semiconductor layer 112 is a silicon layer configured to be transparent to light radiation in a target wavelength range (herein, the target wavelength range is the wavelength range at which the device is configured to operate). In some embodiments, an exemplary target wavelength is in a range of about 1 to about 10 micrometers. In particular, the target wavelength may be in a range of about 1260 to about 1675 nanometers. In some cases, the semiconductor layer 112 may be thinned in a region that requires light transmission, thus resulting in improved transparency of the semiconductor layer 112. It should be noted that for devices that require the transmission of light in a different wavelength range (e.g., visible range or ultraviolet range), a different semiconductor layer may be used. For instance, the semiconductor layer 112 may be an AlN layer, an $Al_2O_3$ layer, a GaN layer, or the like.

The optoelectronic integrated chip 100 includes an e-die 120 (e.g., the first structure for processing and controlling electrical signals). In various embodiments, e-dies may include known semiconductor components and structures for processing and controlling electrical signals. For example, the e-die 120 may include field-effect transistors (e.g., Fin FETS), light emitting devices (e.g., light emitting diodes, laser diodes), bipolar transistors, or any other suitable semiconductor elements. Further, the e-die 120 may include regions configured to isolate (electrically and/or optically) semiconductor elements within the e-die 120. The e-die 120 may include semiconductor layers formed from Si, Ge, SiGe, GaN, AlGaN, InN, GaAs, InAs, any combinations thereof, or the like. Further, the e-die 120 may include dielectric layers. Some of the illustrative materials for dielectric sublayers may include SiO, LaO, AlO, AlN, AlON, ZrO, HfO, SiN, Si, ZnO, ZrN, TiO, TaO, ZrAlO, YO, TaCN, ZrSi, HfSi, SiOCN, SiON, SiOC, or SiCN.

The optoelectronic integrated chip 100 incudes an oxide layer 114 transparent to light radiation in the target wavelength range, as described above. In some embodiments, the oxide layer 114 may be silicon oxide or any other suitable transparent oxide layer. When fabricating the e-die 120 and the oxide layer 114, the oxide layer 114 may be formed first over a surface 119 of the semiconductor layer 112 using any suitable approach (e.g., using chemical vapor deposition (CVD), sputtering, thermal oxidation, and the like). Subsequently, a portion of the oxide layer 114 may be etched using any suitable approach (e.g., dry etching, wet etching, and the like), and the e-die layers may be deposited in a region resulting from etching the oxide layer 114. Alternatively, layers of the e-die 120 may be formed first over the surface 119 of the semiconductor layer 112, and a portion of these layers may be etched using any suitable approach resulting in an etched region. The oxide layer 114 is then deposited in the etched region.

As described above, the e-die 120 is configured to process electrical signals. Such processing may include receiving electrical signals, modifying the electrical signals, and transmitting the electrical signals. In some embodiments, the e-die 120 is configured to receive one or more electrical signals from a p-die 130 in the optoelectronic integrated chip 100 via one or more electrical connecting elements (e.g., contacts) 121. Similarly, the e-die 120 may transmit electrical signals to the p-die 130 via one or more electrical connecting elements 121. The one or more electrical connecting elements 121 may be electrical contacts formed from a metal such as copper, gold, silver, aluminum, or the like, or may be formed from a heavily doped semiconductor material (e.g., doped polysilicon).

In various embodiments, the e-die 120 is able to process or modify electrical signals. For example, the e-die 120 can amplify signals, change time characteristics of electrical signals, or the like, as well as turn on or turn off electrical signals. In some cases, the e-die 120 is configured to power one or more light emitting sources, such as a light emitting diode, a laser diode, or the like. In some cases, the light emitting sources may be a part of the e-die 120. In some other embodiments, the light emitting sources are a part of the p-die 130.

In some embodiments, the light emitting sources are optically coupled to the optoelectronic integrated chip 100 via any suitable optical coupling, such as a prism, a waveguide, or the like. As shown in FIG. 1, in some embodiments, a light emitting source is configured to be coupled with a light-guiding element, such as an optical fiber 115. The optical fiber 115 may be any suitable optical fiber for carrying the light of the target wavelength. Alternatively stated, the light-guiding element is configured to waveguide the light beam having the target wavelength. In some embodiments, when the target wavelength is in the infrared range (e.g., the wavelength is in about 0.9 to about 2 micrometers), the optical fiber 115 can be made from any suitable known material such as silicon oxide, fluoride glass, phosphate glass, silicon core optical fibers, or the like.

In some other embodiments, a light emitting source is coupled to the optoelectronic integrated chip 100 via other means. For example, the light emitting source can be coupled to the optoelectronic integrated chip 100 via another optical fiber, but the present disclosure is not limited thereto. In some other embodiments, the light emitting source is part of the optoelectronic integrated chip 100. For such a case, the optical fiber 115 is configured to receive light radiation emitted from the optoelectronic integrated chip 100.

As discussed above, the optoelectronic integrated chip 100 includes the p-die 130 for processing optical signals. In some embodiments, the p-die 130 may include a diffraction grating coupler 132, being part of a waveguiding layer 131 in the p-die 130. As shown in FIG. 1, a bottom oxide (BOX) layer 134 and a substrate layer 136 may be present to further facilitate light coupling and light guiding. The diffraction grating coupler 132 is configured to receive a light beam 117 from the optical fiber 115 or emit the light beam 117 towards the optical fiber 115. In some embodiments, the waveguiding layer 131 is formed from silicon, and the bottom oxide layer 134 is formed from silicon oxide. In various embodiments, the bottom oxide layer 134 is formed on the substrate layer 136. In some embodiments, the substrate layer 136 is formed from silicon. It should be appreciated that other configurations and/or materials may be used for forming one or more of the waveguiding layer 131, the diffraction grating coupler 132, the bottom oxide layer 134, and the substrate layer 136.

For example, in some embodiments, the bottom oxide layer 134 may be a Bragg reflecting layer formed by a set of silicon oxide and silicon layers. In some cases, the substrate layer 136 includes a metallic layer (e.g., a layer formed from Au or Al) and is configured to reflect light beam(s) from the substrate layer 136. In some cases, the waveguiding layer 131 is made from a material different from silicon. For instance, the waveguiding layer 131 may be made from SiN, polysilicon, or the like. The diffraction grating coupler 132 may include patterning of the waveguiding layer 131 using any suitable grating pattern (e.g., the pattern may include protrusions in the waveguiding layer 131, cavities in the waveguiding layer 131, or the like). The protrusions and/or cavities within the waveguiding layer 131 may include stripes, channels in the form of circular arcs, periodically arranged cylindrical holes having a circular or rectangular cross-section, but the present disclosure is not limited thereto. Alternatively stated, the protrusions and/or cavities within the waveguiding layer 131 may include any suitable patterns.

Figure 2E:
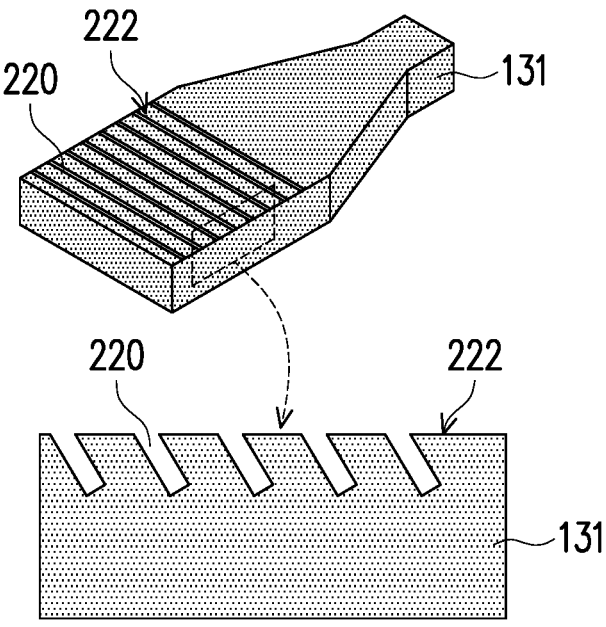

FIGS. 2A-2E are diagrams respectively illustrating possible examples of grating patterns, consistent with some embodiments of the present disclosure. For example, as shown in FIG. 2A, the diffraction grating coupler 132 includes one or more protruding elements 211. As shown in FIG. 2B, the diffraction grating coupler 132 includes one or more cavities 213, which may be cylindrical holes. As shown in FIG. 2C, one or more protrusions 215 extend through the diffraction grating coupler 132 as circular arc(s). As shown in FIG. 2D, the diffraction grating coupler 132 is configured to split non-polarized light beam(s) into two substantially perpendicular directions using a grating pattern including cylindrical cavities arranged in a rectangular grid formation. As shown in FIG. 2E, an exemplary pattern for grating being cavities, in the form of channels 220, includes a slanted orientation relative to a surface 222 of the waveguiding layer 131. It should be appreciated that the diffraction grating couplers, as illustrated in FIG. 2A-2E, are only illustrative examples. Any other type of grating couplers may also be used for coupling light from the optical fiber 115 to the waveguiding layer 131.

In various embodiments, the p-die 130 and the e-die 120 are configured to exchange one of electrical or optical signals. For example, the p-die 130 may be configured to process one or more optical signals and to convert the one or more optical signals into one or more corresponding electrical signals associated with the one or more optical signals using any suitable optical-to-electric signal conversion device, such as p-n photodiodes, p-i-n photodiodes, avalanche photodiodes, phototransistors, or any other types of photodiodes, or other suitable devices, such as photoelectric devices utilizing a photoelectric effect. The generated electrical signal(s) then may be communicated to the e-die 120 for further processing.

In some other embodiments, the e-die 120 may include a light emitting device, such as a laser, a laser diode, a light emitting diode or the like, that is configured to emit a light beam into a receiving port of the p-die 130. In some embodiments, the receiving port of the p-die 130 may be a suitable grating coupler which is similar to the diffraction grating coupler 132, as illustrated in FIG. 1), and further discussion is omitted herein for the sake of brevity.

In various embodiments, the light beam(s) transmitted from the optical fiber 115 may be focused onto the diffraction grating coupler 132 via one or more optical elements located between the optical fiber 115 and the diffraction grating coupler 132. For example, one of such optical devices can be a lens 110 located a distance of H1 from the diffraction grating coupler 132.

In some embodiments, the lens 110 is configured to receive the light beam from the optical fiber 115 and configured to focus the light beam on the diffraction grating coupler 132. In some embodiments, the characteristics of the lens 110 and the distance H1 between the lens 110 and the diffraction grating coupler 132 are selected such that the diffraction grating coupler 132 is in the proximity of a focal point of the lens 110, or at a focal point of the lens 110. For instance, the lens 110 can be selected to be a plano-convex lens with a radius of curvature R such that the focal point of the lens 110 is at the diffraction grating coupler 132. It should be appreciated that the position of a focal point for the lens 110 depends on a refractive index of material surrounding the lens 110. In some embodiments, the optical fiber 115 and the lens 110 are optically connected by a light transparent material (e.g., an optical gel 113) that serves as a light bridge across a gap between the optical fiber 115 and the semiconductor layer 112.

In some embodiments, the optical gel 113 may be index matched to the optical fiber 115. For instance, the optical gel 113 may have an index of refraction in a range of about 1.2 to about 1.6, and the optical fiber 115 may have an index of refraction in a range of about 1.4 to about 1.6. For instance, if the optical fiber 115 is formed from silicon oxide, the index of refraction of the optical fiber 115 is about 1.45 for a wavelength of light of about 1.2 micrometers. A similar index of refraction may be used for the optical gel 113. It should be noted that the silicon index of refraction at this wavelength is about 3.5, thus resulting in an index change between the optical gel 113 and the semiconductor layer 112 (for cases when the semiconductor layer 112 is formed from silicon) of about 2. In some embodiments, the focal point for the lens 110 may be of the same order as the radius of curvature R of the lens 110.

It should be appreciated that the optoelectronic integrated chip 100 with the lens 110 allows for accurate focusing of light onto the diffraction grating coupler 132 (or focusing of light onto the optical fiber 115, for cases when light is emitted by the diffraction grating coupler 132). In various embodiments, the presence of the lens 110 may increase lateral alignment tolerances for various layers and obtain better coupling efficiency. Further, due to the focused light and lower requirements with alignment tolerances, the lens 110 may speed up the testing of wafers when such tests are done on a large scale. Additionally, the presence of the lens 110 may allow for wafer packaging having lower tolerances. Therefore, the overall packaging cost can be lowered.

Figure 3:
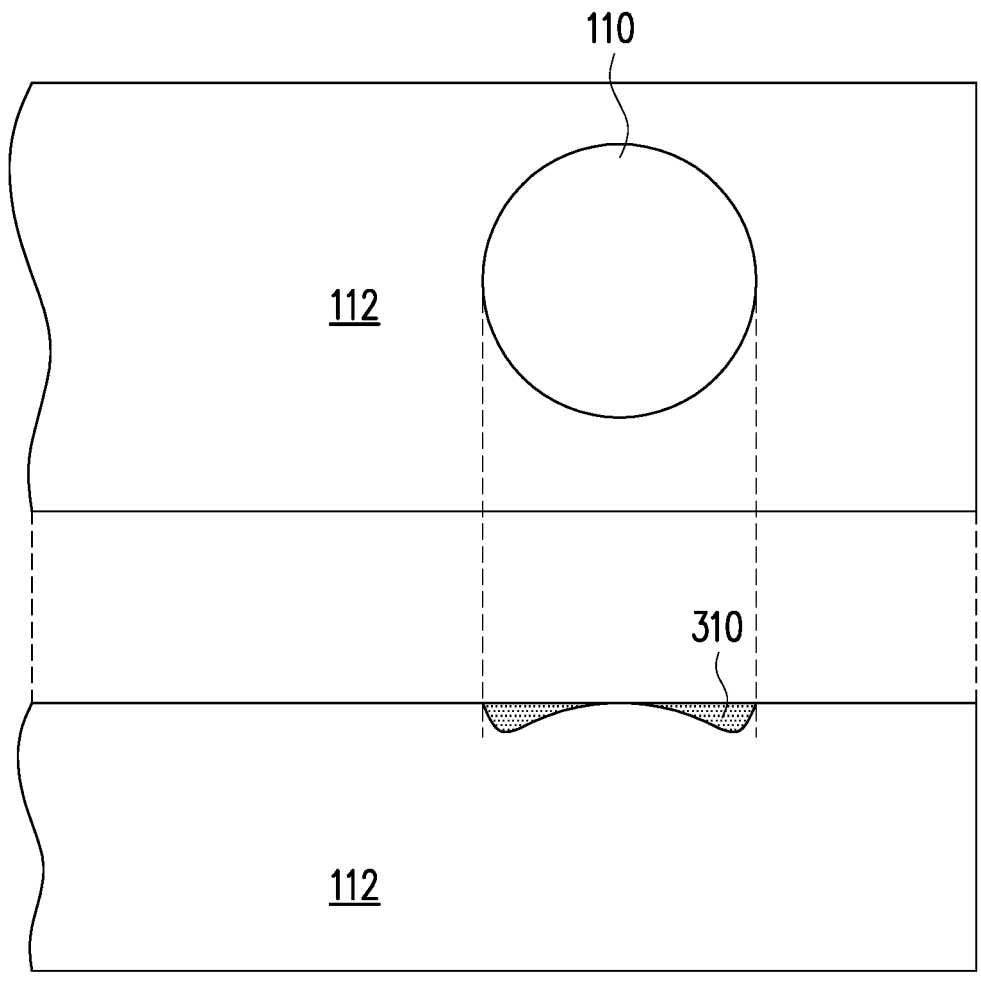
FIG. 3 is a diagram illustrating a top and a side view of the lens, consistent with some embodiments of the present disclosure.

FIG. 3 is a diagram illustrating a top and a side view of the lens 110, consistent with some embodiments of the present disclosure. As shown in FIG. 3, in some embodiments, the lens 110 may be etched directly from the semiconductor layer 112. For example, a region 310 of the semiconductor layer 112 may be removed (e.g., etched) from the semiconductor layer 112, which results in the lens 110 formed over the semiconductor layer 112, as shown in a side view of the lens 110. Alternatively stated, in some embodiments, the lens 110 is formed within an etched region 310 in the semiconductor layer 112.

In some embodiments, in order to form a coupling between the optical fiber 115 and the semiconductor layer 112, the lens 110 is formed first, followed by the formation of the optical gel 113 over the lens 110. While etching the semiconductor layer 112 to form the lens 110 is one possible approach in some embodiments, it should be appreciated that any other approach for forming the lens 110 can be used. For example, in some other embodiments, the lens 110 is separately fabricated from any suitable material and is attached to the semiconductor layer 112 using any suitable method. In one example, the lens 110 is attached to the semiconductor layer 112 via the optical gel 113 or via suitable mechanical means, such as clamps, but the present disclosure is not limited thereto.

Figure 4:
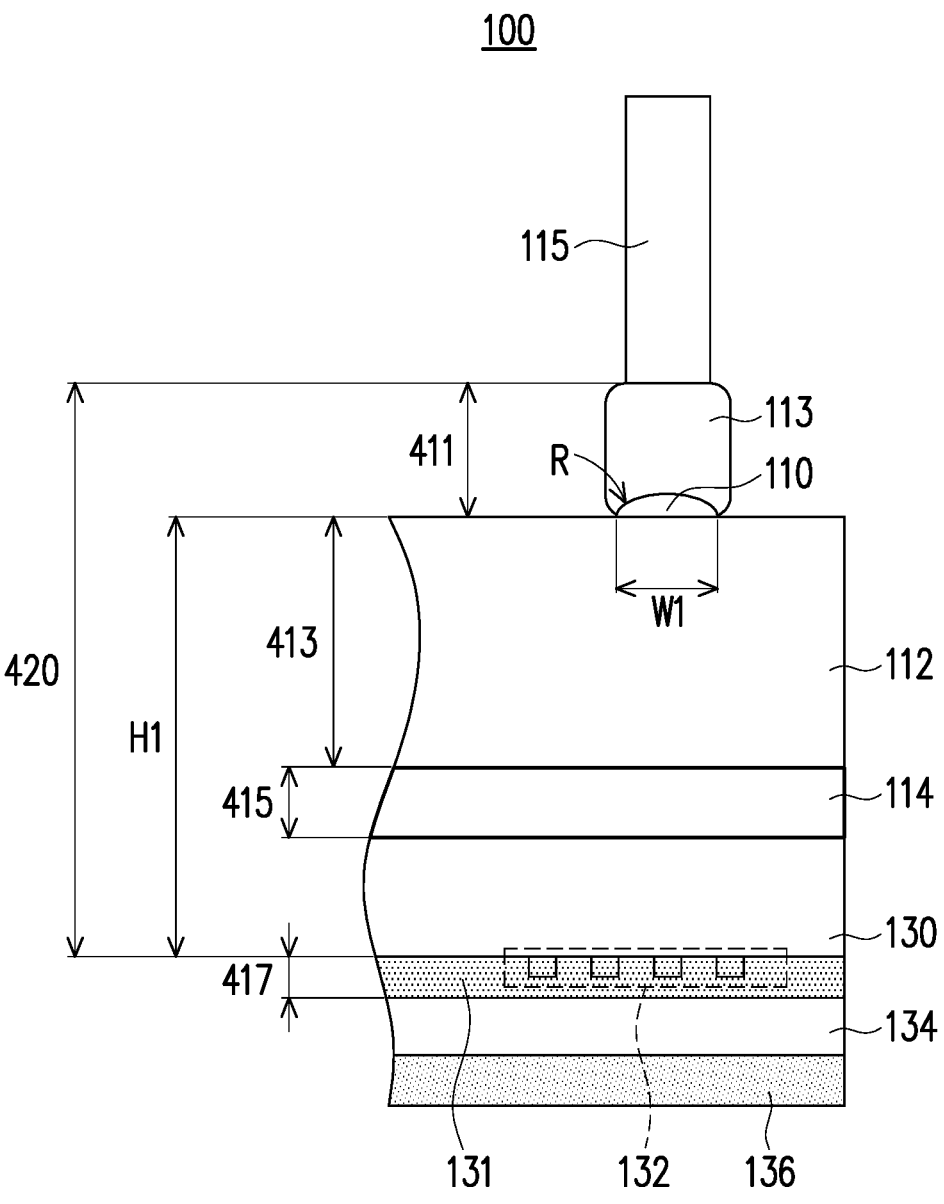
FIG. 4 is a diagram illustrating a portion of the optoelectronic integrated chip, consistent with some embodiments of the present disclosure.

FIG. 4 is a diagram illustrating a portion of the optoelectronic integrated chip 100, including the optical fiber 115, the optical gel 113, the lens 110, and various layers 112-136, consistent with some embodiments of the present disclosure. In some embodiments, the height 411 of an element formed from the optical gel 113 may be in a range between a few tens to a few hundred micrometers (e.g., 10 micrometers, 50 micrometers, 100 micrometers, 200 micrometers, 300 micrometers, 400 micrometers, or the like). In some embodiments, a diameter W1 of the lens 110 is sufficiently large to overcome the fiber shift offset. For example, in some embodiments, a maximum diameter (CD) of the lens 110 can be larger than 100 um, and within a range of about 100 um to 200 um.

In some embodiments, the lens 110 may have the diameter W1 of about a hundred micrometers and a radius of curvature R of a few hundreds of micrometers (e.g., the radius of curvature R may be about 100 to 500 micrometers). That is, the diameter W1 of the lens 110 may be smaller than the radius of curvature R of the lens 110. In some embodiments, the diameter W1 of the lens 110 may be about two to three times smaller than the radius of curvature R. Further, the radius of curvature R of the lens 110 is smaller than the distance H1 from the lens 110 to the diffraction grating coupler 132. For example, the radius of curvature R of the lens 110 may be about two to three times smaller than the distance H1 from the lens 110 to the diffraction grating coupler 132. In some embodiments, the radius of curvature R of the lens 110 is larger than 240 um.

As described above, the lens 110 can be fabricated by etching a top portion (e.g., region 310) of the semiconductor layer 112 or may be formed by any other suitable means. In some embodiments, a thickness 413 of the semiconductor layer 112 may be greater than 300 micrometers and in a range of 300-1000 micrometers, and a thickness 415 of the oxide layer 114 may be between a few micrometers or a few tens of micrometers. In some cases, the thickness 415 may be less than a micron. For example, the thickness 415 may be in a range of about 0.1 to about 10 micrometers.

In some embodiments, a distance 420 from a top surface of the element formed from the optical gel 113 and a top surface of the diffraction grating coupler 132 may be in a range of about 200 to 2000 micrometers. In some embodiments, the distance 420 may be selected to be 600 micrometers, 650 micrometers, 700 micrometers, 750 micrometers, 800 micrometers, or the like. In various embodiments, a thickness 417 of the combined waveguiding layer 131 and the diffraction grating coupler 132 may be a few micrometers. For example, a thickness of the waveguiding layer 131 may be a few hundred nanometers (e.g., about 100 to 500 nanometers), and a thickness of the waveguiding layer 131 may be a few micrometers (e.g., about 1 to 5 micrometers). The characteristic sizes of grating elements for the diffraction grating coupler 132 may be in a range of tens or a few hundred nanometers. In some cases, the thicknesses of the combined waveguiding layer 131 and the diffraction grating coupler 132 may be similar and be in the range of about 0.2 to 5 micrometers.

While the waveguiding layer 131 may be formed from silicon, other materials may be used as well. For example, the waveguiding layer 131 may be formed from silicon nitride or may be a composite layer that includes both silicon and silicon nitride.

In various embodiments, various details of the diffraction grating coupler 132 may depend on the polarization of light used for coupling the diffraction grating coupler 132 and the optical fiber 115. For example, for transverse electric (TE) polarization, a first scale for the diffraction grating coupler 132 may be used, and for transverse magnetic (TM) polarization, a second scale for the diffraction grating coupler 132 may be used. In some cases, a non-uniform diffraction grating coupler 132 may be used for both TE and TM polarizations to improve the overall coupling efficiency between the diffraction grating coupler 132 and the optical fiber 115. The non-uniform diffraction grating coupler 132 implies a grating pattern that changes in size or shape at different locations of the diffraction grating coupler 132.

As described above, various dimensions of elements of the optoelectronic integrated chip 100 need to be selected to ensure that the light beam arriving from the optical fiber 115 is focused on the diffraction grating coupler 132. In some embodiments, the light beam from the optical fiber 115 may be focused onto a substantially circular spot of about a few micrometers in diameter. For example, the circular spot may be on the order of about 1 to 20 micrometers in diameter and may be, for example, 7 micrometers, 8 micrometers, 9 micrometers, or 10 micrometers in diameter.

Figure 5:
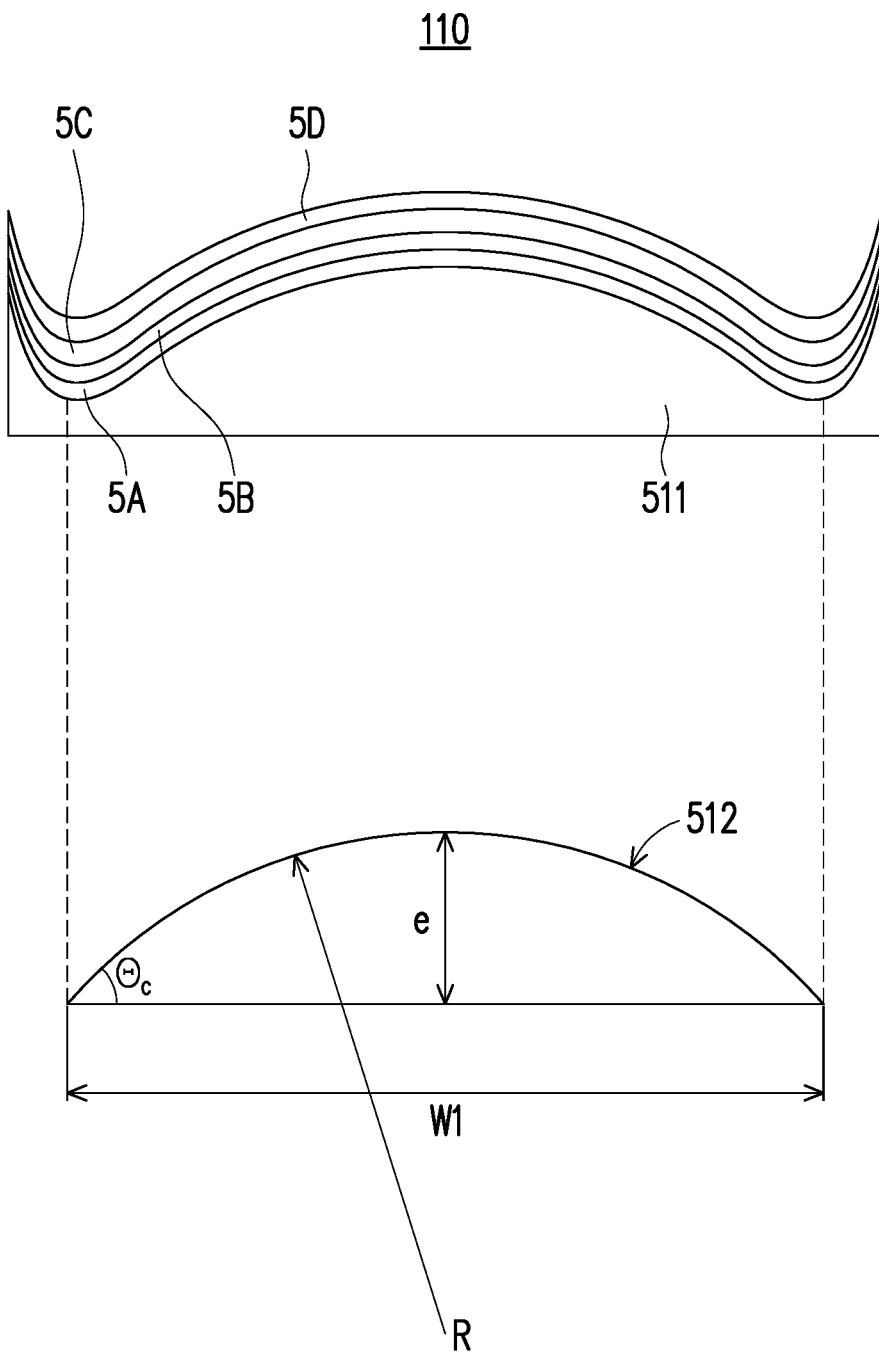
FIG. 5 is a diagram illustrating an exemplary lens, consistent with some embodiments of the present disclosure.

FIG. 5 is a diagram illustrating an exemplary lens 110, consistent with some embodiments of the present disclosure. In some embodiments, the lens 110 may include additional layers 5A-5D. In some cases, the layers 5A-5D may be anti-reflective coating (ARC) layers. In some embodiments, the layers 5A-5D are formed from any suitable layers transparent to the target light wavelength (e.g., to a light wavelength of infrared radiation). In some embodiments, the layers 5A-5D may include silicon oxide layers or silicon nitride (Si3N4) layers.

For example, the layer 5A may be a SiO2 layer with a thickness of about 50 to 200 nanometers, the layer 5B may be a Si3N4 layer with a thickness of about 30 to 100 nanometers, the layer 5C may be a SiO2 layer with a thickness of about 100 to 400 nanometers and the layer 5D may be a Si3N4 layer with a thickness of about 100 to 400 nanometers. In various embodiments, an element 511 of the lens 110 may first be etched in the semiconductor layer 112, and then the layers 5A-5D may be formed over the element 511, resulting in the structure of the lens 110, as shown in FIG. 5. The layers 5A-5D may be formed over the element 511 using any suitable approach such as Chemical Vapor Deposition (CVD), sputtering, evaporation, or the like.

The element 511 of the lens 110 may have a profile indicated by a curve 512. In some embodiments, the diameter W1 may be about 100 micrometers, and the height e of the element 511 may be expressed via angle $\Theta_c$ as e=R(1−cos($\Theta_c$)). In some embodiments, the height e may be a few micrometers (e.g., about 2 to 10 micrometers). In some embodiments, the angle $\Theta_c$ may be between about 5 and 20 degrees.

As discussed above in the embodiments of FIG. 5, the lens 110 may include a silicon core (e.g., the element 511), and layers 5A-5D deposited over the silicon core. In some embodiments, the layers 5A-5D include at least a layer (e.g., SiO2 layer 5C) having a refractive index lower than a refractive index of silicon, and another layer (e.g., Si3N4 layer 5B) having a refractive index lower than the refractive index of silicon but higher than the refractive index of the SiO2 layer 5C. In addition, the thickness of the Si3N4 layer 5B is lower than the thickness of the SiO2 layer 5C. In some embodiments, the overall thickness of the lens 110 is within a range of about 1 um to about 50 um. In some embodiments, the thickness of the lens 110 is greater than about 5 um, but the present disclosure is not limited thereto.

Figure 6:
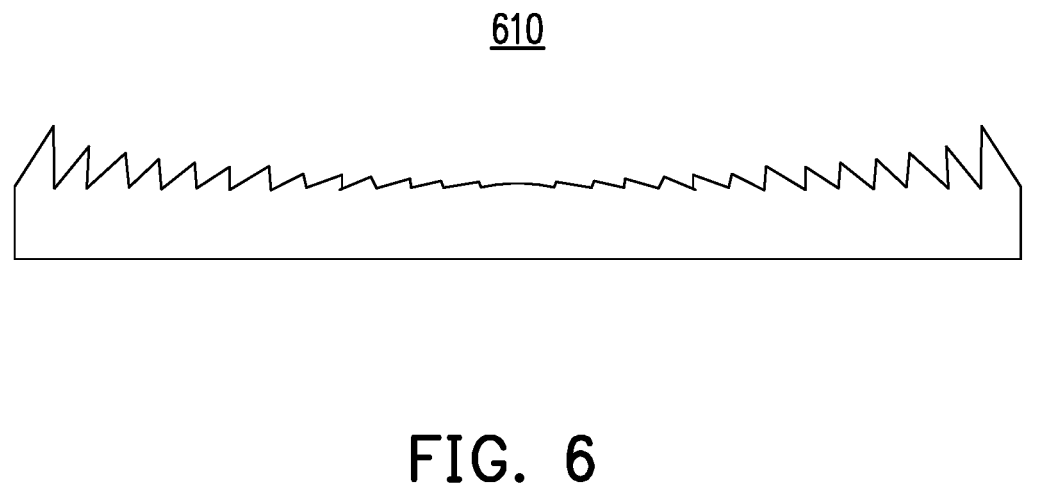

FIG. 6 is a diagram illustrating an exemplary lens 610, consistent with some other embodiments of the present disclosure. In the embodiments of FIG. 6, the lens 610 may be a Fresnel lens. The Fresnel lens 610 may be fabricated using any suitable approach (e.g., etching). In some cases, the Fresnel lens 610 may be formed separately and then attached to the semiconductor layer 112. Similar to the lens 110 shown in FIG. 5, the Fresnel lens 610 may include ARC layers, such as the layers 5A-5D, as shown in FIG. 5.

Figure 7:
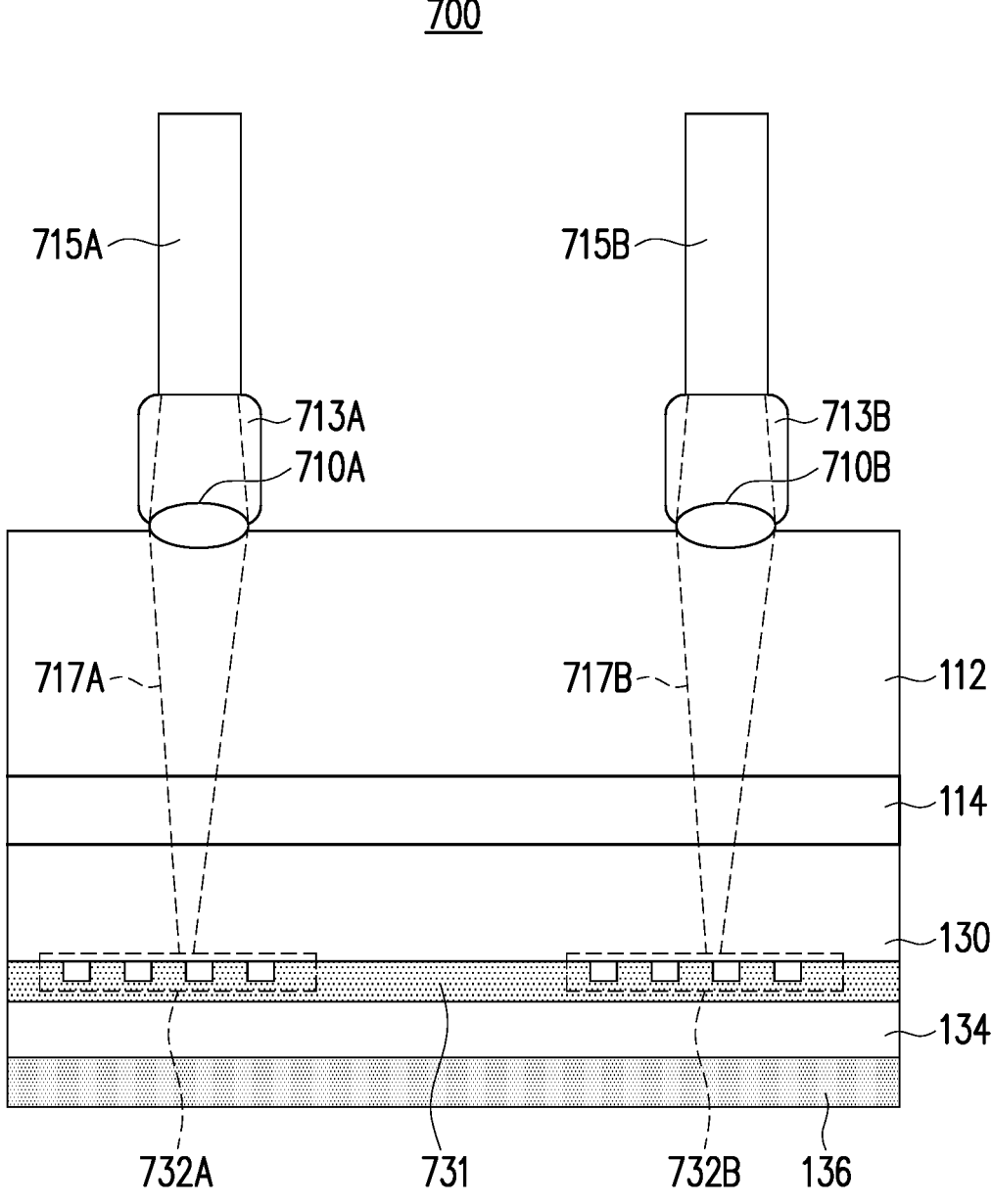
FIG. 7 is a diagram illustrating an optoelectronic device, consistent with some embodiments of the present disclosure.

FIG. 7 is a diagram illustrating an optoelectronic device 700 having two optical fibers 715A and 715B, and two grating couplers 732A and 732B, consistent with some embodiments of the present disclosure. In some embodiments, the layers 112, 114, 134, and 136, which are the same or similar to those depicted in FIG. 1, are given the same reference labels, and the detailed description thereof is omitted. As shown in FIG. 7, a waveguiding layer 731 in the optoelectronic device 700 may be similar to the waveguiding layer 131 depicted in FIG. 1. Compared to the waveguiding layer 131 of FIG. 1, the waveguiding layer 731 in the optoelectronic device 700 includes two grating couplers 732A and 732B formed within a top portion of the waveguiding layer 731. The grating couplers 732A and 732B may have the same or similar structure as the diffraction grating coupler 132 depicted in FIGS. 1 and 2A-2E.

In some embodiments, the optoelectronic device 700 is configured to receive the light beam from the optical fiber 715A, to couple the received light beam to the waveguiding layer 731 via the grating coupler 732A, to transmit the light beam to the grating coupler 732B, and to reemit the light beam via the grating coupler 732B into the optical fiber 715B. As shown in FIG. 7, a light beam 717A is focused onto the grating coupler 732A via a lens 710A, and a lens 710B is used to focus a light beam 717B emitted by the grating coupler 732B onto the optical fiber 715B. Similar to the optoelectronic integrated chip 100 depicted in FIG. 1, the optical fibers 715A and 715B may be optically connected using respective optical coupling elements 713A and 713B. In some embodiments, the optical coupling elements 713A and 713B are formed using optical gel, as described above.

Figure 8A:
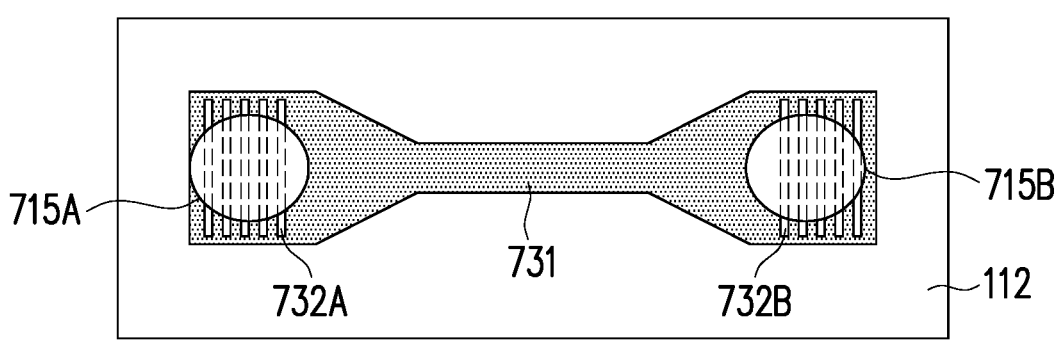
FIG. 8A is a diagram illustrating exemplary grating couplers, consistent with some embodiments of the present disclosure.

FIG. 8A is a diagram illustrating a top view of exemplary grating couplers 732A and 732B connected by a waveguiding layer 731, consistent with some embodiments of the present disclosure. As previously shown in FIG. 7, the optical fibers 715A and 715B are respectively placed above the grating couplers 732A and 732B such that light beams from/to the optical fibers 715A and 715B couple with the waveguiding layer 731 via the grating couplers 732A and 732B. In various embodiments, the grating couplers 732A and 732B are located underneath the semiconductor layer 112, as also depicted in FIG. 7.

Figure 8B:
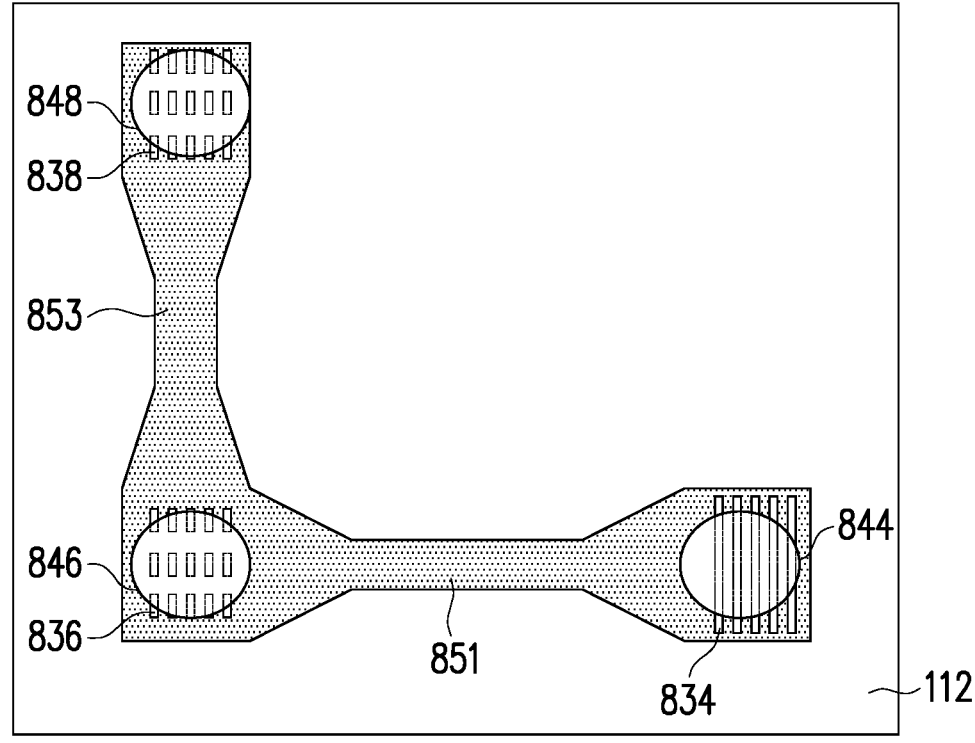
FIG. 8B is a diagram illustrating exemplary grating couplers for the optoelectronic integrated chip, consistent with some embodiments of the present disclosure.

FIG. 8B is a diagram illustrating a top view of grating couplers 834, 836, and 838 for the optoelectronic integrated chip 100, consistent with some embodiments of the present disclosure. In some embodiments, each one of the grating couplers 834, 836, and 838 is coupled to the respective optical fibers 844, 846, and 848. As shown in FIG. 8B, in some embodiments, the grating coupler 834 has a first grating pattern (e.g., stripes), while the grating coupler 836 and the grating coupler 838 have a second grating pattern (e.g., cavities), but the present disclosure is not limited thereto. In some embodiments, the second grating pattern allows, for example, the grating coupler 836 to couple received light from the optical fiber 846 to the waveguiding layers 851 and 853. In various embodiments, the waveguiding layers 851 and 853 have a similar geometry as the waveguiding layer 131 shown in FIG. 1. Additionally, the waveguiding layers 851 and 853 may be made from the same or similar material as the waveguiding layer 131.

In some embodiments, the light beam from the optical fiber 846 is received by the grating coupler 836 and is distributed to the grating couplers 834 and 838 via the waveguiding layers 851 and 853. Alternatively, the light beam may be received by one (or both) of the grating couplers 834 and 838, and, via one (or both) of the waveguiding layers 851 and 853, coupled to the grating coupler 836. In some embodiments, the light beam received by the grating coupler 836 is emitted to the optical fiber 846. It would be appreciated that any other combinations of signals received or transmitted to the optical fibers 844, 846, and 848 can be used according to practical needs. Further, a photonic circuit of the grating couplers 834, 836, and 838, the waveguiding layers 851 and 853, and the optical fibers 844, 846, and 848 is only an illustrative example of various possible circuits. In various applications, other configurations of photonic circuits may be used accordingly.

In some embodiments, when the optical fibers (e.g., optical fibers 844, 846, and 848) are coupled to the grating couplers (e.g., the grating couplers 834, 836, and 838), one or more lens elements, such as the lens 110, can be used either to focus the light emitted from an optical fiber to a grating coupler, or to focus the light emitted from the grating coupler into the optical fiber. In various embodiments, such coupling between the optical fiber and the grating coupler is facilitated via an optical element that may be formed from an optical gel. In some embodiments, the optical element has a lateral size that is equal to a diameter of the lens 110. The optical fiber (e.g., optical fibers 844, 846, and 848) can be coupled to the lens via the optical element, in which the optical element has a first index of refraction substantially matching a second index of refraction of the optical fiber.

Figure 9:
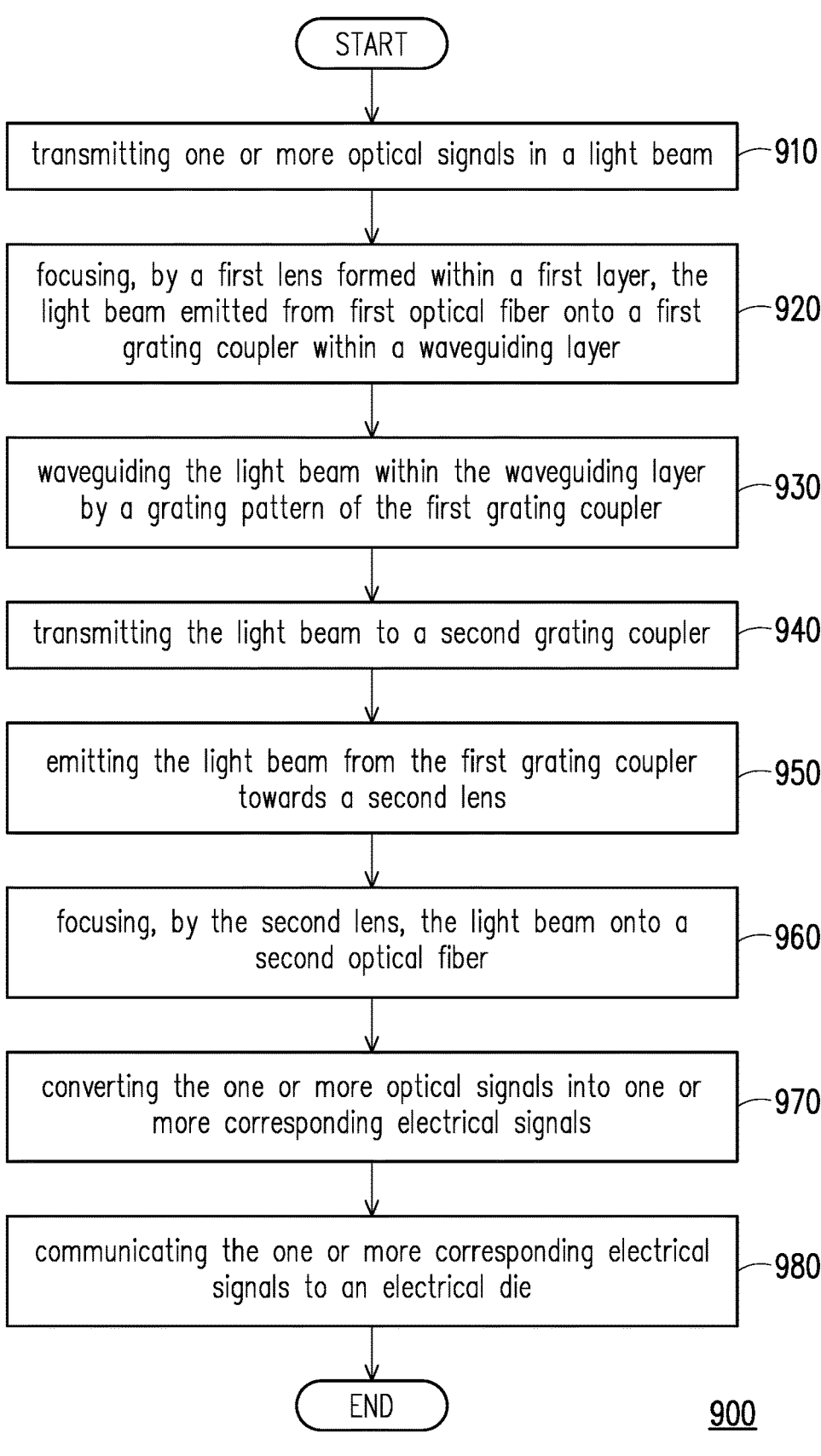
FIG. 9 is a flow chart illustrating a method for optical signal processing, consistent with some embodiments of the present disclosure.

Reference is made to FIG. 9. FIG. 9 is a flow chart illustrating a method 900 for optical signal processing, consistent with some embodiments of the present disclosure. For better understanding of the present disclosure, the method 900 is discussed in relation to embodiments shown in FIG. 1 to FIGS. 8A and 8B, but is not limited thereto. As shown in FIG. 9, in some embodiments, the method 900 includes operations 910-960.

In operation 910, one or more optical signals are transmitted via a first optical fiber (e.g., the optical fiber 715A in FIG. 7) in a light beam. In operation 920, the light beam emitted from the first optical fiber is focused, by a first lens (e.g., the lens 710A in FIG. 7) formed within a first layer (e.g., the layer 112), onto a first grating coupler (e.g., the grating coupler 732A in FIG. 7) within a waveguiding layer (e.g., the waveguiding layer 731 in FIG. 7) via the first layer and a second layer (e.g., the oxide layer 114 in FIG. 7) above the waveguiding layer. In operation 930, the light beam within the waveguiding layer is waveguided by a grating pattern of the first grating coupler.

In operation 940, the light beam within the waveguiding layer is transmitted from the first grating coupler to a second grating coupler (e.g., the grating coupler 732B in FIG. 7) within the waveguiding layer. In operation 950, the light beam from the first grating coupler is emitted, by the second grating coupler, towards a second lens (e.g., the lens 710B in FIG. 7) formed within the first layer via the second layer and the first layer. In operation 960, the light beam is focused, by the second lens, onto a second optical fiber (e.g., the optical fiber 715B in FIG. 7).

In some embodiments, the method 900 further includes operations 970 and 980. In operation 970, the one or more optical signals are converted into one or more corresponding electrical signals associated with the one or more optical signals. In operation 980, the one or more corresponding electrical signals are communicated to an electrical die (e.g., e-die 120 in FIG. 1) for processing the one or more corresponding electrical signals.

Reference is made to FIG. 10. FIG. 10 is a flow chart illustrating a method 1000 for fabricating a semiconductor device for optical signal processing, consistent with some embodiments of the present disclosure. For better understanding of the present disclosure, the method 1000 is discussed in relation to embodiments shown in FIG. 1 to FIGS. 8A and 8B, but is not limited thereto. As shown in FIG. 10, in some embodiments, the method 1000 includes operations 1010-1060.

In operation 1010, a substrate layer (e.g., layer 136 in FIG. 1) is provided. In operation 1020, a first oxide layer (e.g., layer 134 in FIG. 1) is formed over the substrate layer. In operation 1030, a waveguiding layer (e.g., layer 131 in FIG. 1) for waveguiding a light beam is formed over the first oxide layer. In some embodiments, a grating coupler (e.g., diffraction grating coupler 132 in FIG. 1) is formed and disposed over the waveguiding layer.

In operation 1040, a second oxide layer (e.g., layer 114 in FIG. 1) transparent to the light beam with a target wavelength is formed over the waveguiding layer. In operation 1050, a semiconductor layer (e.g., layer 112 in FIG. 1) transparent to the light beam is formed over the second oxide layer. In operation 1060, a lens (e.g., lens 110 in FIG. 1) disposed within the semiconductor layer and adjacent to a surface of the semiconductor layer is formed. In some embodiments, the lens can be formed within an etched region (e.g., etched region 310 in FIG. 3) in the semiconductor layer, or can be separately fabricated from any suitable material and attached to the semiconductor layer.

In some embodiments, a radius of curvature of the lens is smaller than a distance from the lens to the grating coupler. In some embodiments, the lens is formed by forming a silicon core (e.g., element 511 in FIG. 5) and forming multiple layers (e.g., layers 5A-5D in FIG. 5) deposited over the silicon core. The multiple layers including one layer (e.g., SiO2 layer 5C in FIG. 5) having a refractive index lower than a refractive index of silicon, and another layer (e.g., Si3N4 layer 5B in FIG. 5) having a refractive index lower than the refractive index of silicon but higher than the refractive index of the one layer.

By arranging one or more micro lenses in a 3D SOIC to collimate divergent light beams and to focus the collimated light beam from an external source to spot on a corresponding grating coupler in the 3D SOIC, the fiber light loss can be reduced by the convex micro lenses on the silicon layer. The lateral alignment tolerances can be enhanced, and an improved coupling efficiency performance is obtained under the 3D packaging structure when remaining the same light beam size. In addition, the wafer-scale testing speed can be increased and the testing performed more easily. Accordingly, the testing process can be performed more efficiently, and a low-cost packaging process can be achieved, which is suitable for various 3D structures without technology dependency. For example, the structures and methods disclosed in various embodiments may be applied in various silicon photonics input/output and/or high speed applications, and the process variation with the fiber shift loss is reduced.

In some embodiments, a device for optical signal processing is disclosed that includes a first layer, a second layer and a waveguiding layer. A lens is disposed within the first layer and adjacent to a surface of the first layer. The second layer is underneath the first layer and adjacent to another surface of the first layer. The waveguiding layer is located underneath the second layer and configured to waveguide a light beam transmitted in the waveguiding layer. A grating coupler is disposed over the waveguiding layer. The lens is configured to receive, from one of the grating coupler or a light-guiding element, the light beam, and focus the light beam towards another one of the light-guiding element or the grating coupler.

In some embodiments, a system for optical signal processing is also disclosed that includes a first optical fiber configured to transmit one or more optical signals using a light beam, and a photonic die configured to process the one or more optical signals. The photonic die includes: a first layer formed from a material transparent to the light beam; a first lens formed within the first layer and adjacent to a top surface of the first layer, the first lens being associated with the first optical fiber; a second layer located underneath the first layer, the second layer formed from the material transparent to the light beam; a waveguiding layer located underneath the second layer, and configured to waveguide the light beam; and a first grating coupler associated with the first lens and formed over the waveguiding layer.

In some embodiments, a method for fabricating a semiconductor device is also disclosed that includes providing a substrate layer; forming a first oxide layer over the substrate layer; forming a waveguiding layer for waveguiding a light beam over the first oxide layer; forming a second oxide layer transparent to the light beam with a target wavelength over the waveguiding layer; forming a semiconductor layer transparent to the light beam over the second oxide layer; and forming a lens disposed within the semiconductor layer and adjacent to a surface of the semiconductor layer.

The accompanying figures and this description depict and describe various embodiments and features and components thereof. Those skilled in the art will appreciate that any particular nomenclature used in this description was merely for convenience, and thus various embodiments should not be limited by the specific process identified and/or implied by such nomenclature. Therefore, it is desired that the embodiments described herein be considered in all respects as illustrative, not restrictive, and that reference be made to the appended claims for determining the scope of various embodiments.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure and that they may make various changes, substitutions, and alterations herein without departing from the spirit and scope of the present disclosure.

What is claimed is:

1. An optical signal processing device, comprising:
a lens disposed within a first layer, wherein the lens comprises a plurality of anti- reflective coating (ARC) layers formed above a curved surface;
a second layer underneath the first layer;
a waveguiding layer located underneath the second layer and configured to waveguide a light beam transmitted in the waveguiding layer; and
a grating coupler disposed over the waveguiding layer;
wherein the lens is configured to focus the light beam towards a light-guiding element or the grating coupler.

2. The optical signal processing device of claim 1, wherein the first layer and the second layer are formed from a material transparent to the light beam with a target wavelength.

3. The optical signal processing device of claim 2, wherein the light-guiding element is configured to waveguide the light beam having the target wavelength.

4. The optical signal processing device of claim 1, wherein the lens is formed within an etched region in the first layer.

5. The optical signal processing device of claim 1, wherein a radius of curvature of the lens is smaller than a distance from the lens to the grating coupler.

6. The optical signal processing device of claim 5, wherein a diameter of the lens is smaller than the radius of curvature of the lens.

7. The optical signal processing device of claim 1, wherein the light-guiding element comprises an optical fiber for coupling the light beam to the lens.

8. The optical signal processing device of claim 7, wherein the optical fiber is coupled to the lens via an optical element having a first index of refraction substantially matching a second index of refraction of the optical fiber.

9. The optical signal processing device of claim 8, wherein the optical element is formed from an optical gel, and wherein the optical element has a lateral size that is equal to a diameter of the lens.

10. The optical signal processing device of claim 1, wherein the lens comprises a silicon core and a plurality of layers deposited over the silicon core, wherein the plurality of layers include at least a third layer having a refractive index lower than a refractive index of silicon.

11. The optical signal processing device of claim 10, wherein the plurality of layers include a fourth layer having a refractive index lower than the refractive index of silicon but higher than the refractive index of the third layer.

12. The optical signal processing device of claim 11, wherein a thickness of the fourth layer is lower than a thickness of the third layer.

13. An optical signal processing system comprising:
a first optical fiber configured to transmit one or more optical signals using a light beam; and
a photonic die configured to process the one or more optical signals, the photonic die comprising:
a first lens formed within a first layer, the first lens being associated with the first optical fiber and comprises a plurality of anti-reflective coating (ARC) layers formed above a curved surface;
a second layer located underneath the first layer;
a waveguiding layer located underneath the second layer, and configured to waveguide the light beam transmitted in the waveguiding layer; and
a first grating coupler associated with the first lens and formed over the waveguiding layer, wherein the first lens is configured to focus the light beam towards a light-guiding element or the first grating coupler.

14. The optical signal processing system of claim 13, further comprising:
an electrical die configured to process one or more electrical signals, wherein the photonic die is integrated with the electrical die and configured to convert the one or more optical signals into the one or more electrical signals.

15. The optical signal processing system of claim 13, wherein the photonic die further comprises:
a second optical fiber configured to transmit the one or more optical signals;
a second lens formed within the first layer and adjacent to a top surface of the first layer, the second lens being associated with the second optical fiber; and
a second grating coupler associated with the second lens and formed over the waveguiding layer.

16. The optical signal processing system of claim 15, wherein:
the first lens is configured to receive the light beam from the first optical fiber and focus the light beam onto the first grating coupler using the first lens;
the first grating coupler is configured to transmit the light beam to the second grating coupler;
the second grating coupler is configured to emit the light beam towards the second lens; and
the second lens is configured to focus the light beam onto the second optical fiber.

17. The optical signal processing system of claim 16, wherein the first grating coupler and the second grating coupler are formed within a top portion of the waveguiding layer.

18. An optical signal processing device, comprising:
a first oxide layer over a substrate layer;
a waveguiding layer, over the first oxide layer, for waveguiding a light beam transmitted in the waveguiding layer;
a grating coupler disposed over the waveguiding layer;
a second oxide layer, over the waveguiding layer, transparent to the light beam with a target wavelength;
a semiconductor layer, over the second oxide layer, transparent to the light beam, wherein the second oxide layer is underneath the semiconductor layer and adjacent to a surface of the semiconductor layer; and a lens disposed within the semiconductor layer, wherein the lens comprises a plurality of anti-reflective coating (ARC) layers formed above a curved surface and is configured to focus the light beam towards a light-guiding element or the grating coupler.

19. The optical signal processing device of claim 18, wherein a radius of curvature of the lens is smaller than a distance from the lens to the grating coupler.

20. The optical signal processing device of claim 18, wherein the lens comprises:

a silicon core having the curved surface; and the plurality of ARC layers deposited over the silicon core, the plurality of ARC layers including a third ARC layer having a refractive index lower than a refractive index of silicon, and a fourth ARC layer having a refractive index lower than the refractive index of silicon but higher than the refractive index of the third ARC layer.

* * * * *